United States Patent [19]

Kasai

[11] Patent Number: 4,982,480
[45] Date of Patent: Jan. 8, 1991

[54] PAIR OF SNAPPINGLY ENGAGEABLE MEMBERS

[75] Inventor: Kazumi Kasai, Namerikawa, Japan

[73] Assignee: Yoshida Kogyo, K.K., Tokyo, Japan

[21] Appl. No.: 462,351

[22] Filed: Jan. 3, 1990

Related U.S. Application Data

[63] Continuation of Ser. No. 197,144, May 23, 1988, abandoned.

[30] Foreign Application Priority Data

May 20, 1987 [JP] Japan .................................. 63-73543
May 25, 1987 [JP] Japan .............................. 62-78409[U]

[51] Int. Cl.$^5$ ............................................. A44B 17/00
[52] U.S. Cl. ........................................ 24/575; 24/104; 24/605; 24/630
[58] Field of Search ................ 24/605, 575, 630, 657, 24/697, 675, 104, 107, 108

[56] References Cited

FOREIGN PATENT DOCUMENTS

| 16433 | 6/1904 | Austria | 24/575 |
| 1026120 | 4/1953 | France | 24/575 |
| 3911309 | 4/1961 | Japan . | |
| 434035 | 2/1968 | Japan . | |
| 168861 | 4/1922 | United Kingdom | 24/575 |
| 2035440 | 6/1980 | United Kingdom . | |

Primary Examiner—Laurie K. Cranmer
Attorney, Agent, or Firm—Hill, Van Santen, Steadman & Simpson

[57] ABSTRACT

A pair of snappingly engageable members of identical shape each comprising a base having a pair of male snap legs disposed on one surface thereof in spaced confronting relation to each other, the male snap legs having bulging portions, respectively, projecting laterally away from each other, and a pair of female snap legs disposed on said one surface in spaced confronting relation to each other, the female snap legs having a pair of locking portions, respectively, projecting laterally toward each other, the bulging portions and the locking portions having longitudinal ends confronting each other. When the snappingly engageable members are put together, the male snap legs on the base of one of the snappingly engageable members snappingly engage the female snap legs on the base of the other snappingly engageable member, and the female snap legs on the base of said one snappingly engageable member snappingly engage the male snap legs on the base of the other snappingly engageable member.

9 Claims, 6 Drawing Sheets

PAIR OF SNAPPINGLY ENGAGEABLE MEMBERS

This is a continuation of application Ser. No. 197,144, filed May 23, 1988 now abandoned.

BACKGROUND OF THE INVENTION

1. Field of the Invention

The present invention relates to a pair of snappingly engageable members of synthetic resin for snappingly engaging two parts of a snap fastener such as a snap botton for use on a garment or a bag, or a cord stopper, or the like.

2. Description of the Prior Art

Conventional snappingly engageable members of synthetic resin for snap fasteners such as snap buttons are disclosed in Japanese Utility Model Publication No. 39-11309 published Apr. 30, 1964 and Japanese Patent Publication No. 43-4035 published Feb. 14, 1968, for example. These known snappingly engageable members comprise a male member having an annular stud projecing from one side of a base and a female member having an annular socket on a base. The male and female members can be combined with each other by inserting the annular stud snappingly into the annular socket.

One problem with the known snappingly engageable members is that care should be taken in assembling them since the male and female members are structurally different from each other and have to be sorted out from each other.

SUMMARY OF THE INVENTION

In view of the aforesaid problem of the conventional snappingly engageable members, it is an object of the present invention to provide a pair of snappingly engageable members which can easily be assembled in a foolproof process without taking special care.

According to the present invention, there is provided a pair of snappingly engageable members of identical shape each comprising a base having a pair of male snap legs disposed on one surface thereof in spaced confronting relation to each other, the male snap legs having bulging portions, respectively, projecting laterally away from each other, and a pair of female snap legs disposed on said one surface in spaced confronting relation to each other, the female snap legs having a pair of locking portions, respectively, projecting laterally toward each other, the bulging portions and the locking portions having longitudinal ends confronting each other.

When the snappingly engageable members are put together, the male snap legs on the base of one of the snappingly engageable members snappingly engage the female snap legs on the base of the other snappingly engageable member, and the female snap legs on the base of said one snappingly engageable member snappingly engage the male snap legs on the base of the other snappingly engageable member.

Many other advantages and features of the present invention will become manifest to those versed in the art upon making reference to the detailed description and the accompanying sheets of drawings in which preferred structural embodiments incorporating the principles of the present invention are shown by way of illustrative example.

BRIEF DESCRIPTION OF THE DRAWINGS

FIG. 15 is a front elevational view of the snappingly engageable members, as assembled, of FIG. 9.

DETAILED DESCRIPTION

Figure 1:
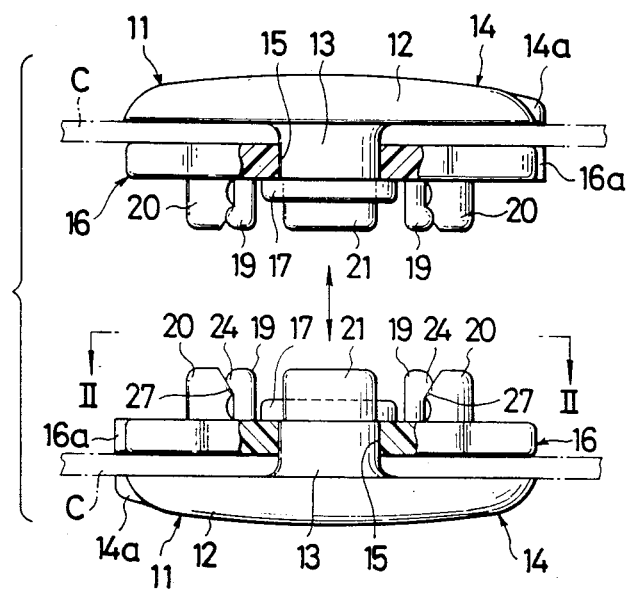
FIG. 1 is a front elevational view of snappingly engageable members according to a first embodiment of the present invention.

Identical parts are denoted by identical reference numerals throughout views.

FIG. 1 shows two snap fasteners 11 shown as snap buttons each incorporating a snappingly engageable member according to a first embodiment of the present invention. Each of the snap buttons 11 comprises an attachment 14 made of synthetic resin and having a central stud 13 projecting from the back of a head 12, and a snappingly engageable member made of synthetic resin and including a base 16 having a central insertion hole 15 extending transversely therethrough.

Figure 5:
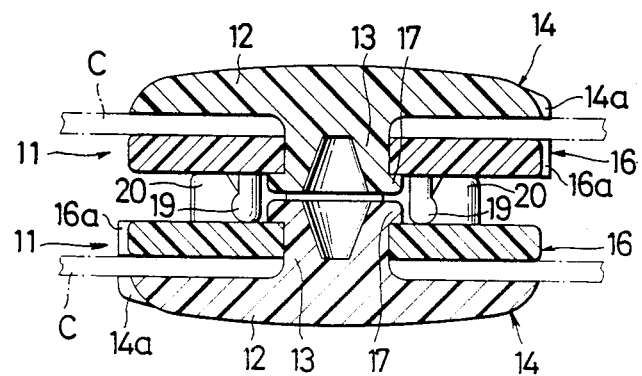
FIG. 5 ia a cross-sectional view of the snappingly engageable members, as assembled, of FIG. 1.

The snappingly engageable member is fixed to the distal end of the stud 13 inserted into the insertion hole 15 with a piece of cloth C clamped between the head 12 and the base 16, the distal end of the stud 13 being deformed into a flange 17 which engages the face of the base 16 (see also FIG. 5).

Figure 2:
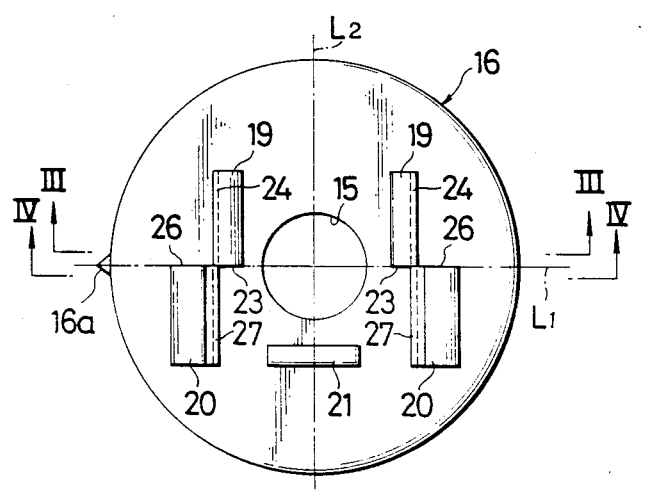
FIG. 2 is a plan view taken along line II—II of FIG. 1, showing a base.

As shown in FIGS. 1 and 2, the base 16 is of a disc shape having on its face a pair of male snap legs 19, a pair of female snap legs 20, and a guide leg 21, all projecting away from the attachment 14 and having substantially rectangular elongate shapes. The male snap legs 19, the female snap legs 20, and the guide leg 21 are of substantially the same height, and project beyond the top surface of the flange 17.

Figure 3:
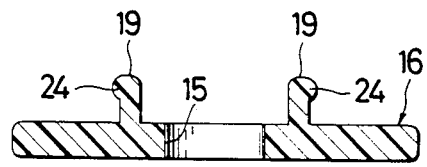
FIG. 3 is a cross-sectional view taken along line III—III of FIG. 2.

The male snap legs 19 have side stopper surfaces 23, respectively, aligned with a first central line L1 extending diametrically across the base 16, and are symmetrically positioned with respect to a second central line L2 extending also diametrically across the base 16 in perpendicular relation to the first central line L1. The male snap legs 19 are of the same length in the direction along the second central line L2. As illustrated in FIG. 3, the male snap legs 19 have bulging portions 24, respectively, on outer side edges thereof, the bulging portions 24 projecting laterally outwardly away from each other.

Figure 4:
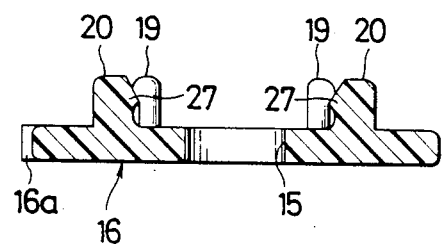
FIG. 4 is a cross-sectional view taken along line IV—IV of FIG. 2.

The female snap legs 20 have side stopper surfaces 26, respectively, aligned with the first central line L1, and are symmetrically positioned with respect to the second central line L2. The female snap legs 20 are positioned farther from the second central line L2 than the male snap legs 19, but have their side stopper surfaces 26 partly contiguous to the side stopper surfaces 23 of the male snap legs 19. The female snap legs 20 are of the same length in the direction along the second central line L2. The male and female snap legs 19, 20 are equal in length to each other. As shown in FIG. 4, the female snap legs 20 have locking portions 27, respectively, on inner side edges thereof, the locking portions 27 projecting laterally inwardly toward each other. The bulging portions 24 of the male snap legs 19 on the base 16 of one of the snappingly engageable members (on the upper side, for example, in FIG. 1) can snappingly engage the locking portions 27 of the female snap legs 20 on the base 16 of the other snappingly engageable member (on the lower side, for example, in FIG. 1). The bulging portions 24 of the male snap legs 19 and the locking portions 27 of the female snap legs 20 have their longitudinally confronting ends positioned adjacent to and facing each other.

The guide leg 21 is disposed across the second central line L2 between the female snap legs 20 remotely from the first central line L1 and extends along the first central line L1. The guide leg 21 has a length smaller than the dimension or distance between the inner confronting side surfaces of the male snap legs 19.

The attachment 14 has a projection 14a on a peripheral edge thereof for positioning a directional pattern or group of letters on the face of the head 12. Likewise, the base 16 of the snappingly engageable member also has a projection 16a on a peripheral edge thereof for orienting or positioning the base 16 with respect to the piece of cloth C.

When the snappingly engageable members mounted on the respective pieces of cloth C are to be brought into snapping engagement with each other as shown in FIG. 5, the snappingly engageable members are axially aligned and superposed on each other while the projections 16a being disposed in diametrically opposite relation to each other across the insertion holes 15. Then, with the guide legs 21 on the bases 16 facing each other across the insertion holes 15, the bases 16 are pressed against each other. The male snap legs 19 on one of the bases 16 snappingly engage the female snap legs 20 on the other base 16, and the female snap legs 20 on one of the bases 16 snappingly engage the male snap legs 19 on the other base 16 (see FIG. 5). The guide legs 21 may not necessarily be required.

The snappingly engageable members are identical in construction to each other and can be brought into interfitting engagement when putting the snap fasteners together. The snappingly engageable members are not required to be sorted out from each other. Therefore, the snap fasteners such as snap buttons 11 can be assembled in a foolproof fashion without the need for special assembling care. Since the stopper surfaces 23, 26 of the male and female snap legs 19, 20 are partly positioned adjacent to each other, when the snap buttons 11 are put together, the side stopper surfaces 23 of the male snap legs 19 of one of the bases 16 are held against the side stopper surfaces 23 of the male snap legs 19 of the other base 16, and the side stopper surfaces 26 of the female snap legs 20 of one of the bases 16 are held against the side stopper surfaces 26 of the female snap legs 20 of the other base 16. Accordingly, the snappingly engageable members are prevented from being displaced or wobbling with respect to each other once they are assembled together. Inasmuch as the snappingly engageable members are of the same shape, they can be molded by one type of molds, and a molding machine for molding them is required to have only one hopper and one chute.

Figure 6:
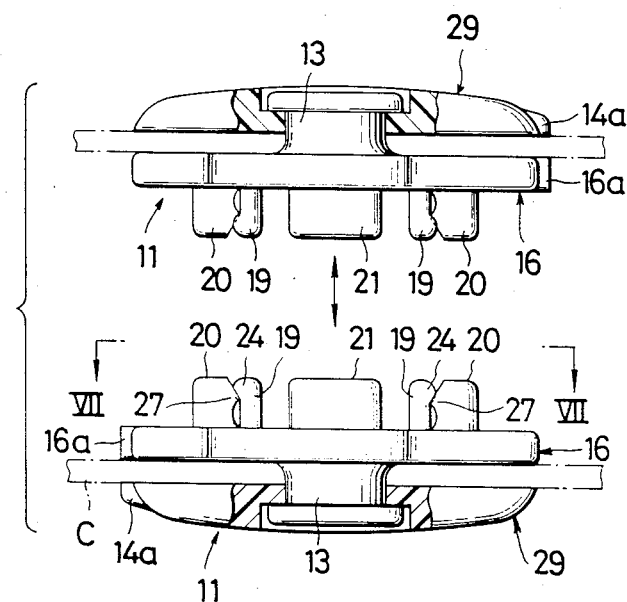
FIG. 6 is a front elevational view of snappingly engageable members according to a second embodiment of the present invention.
Figure 7:
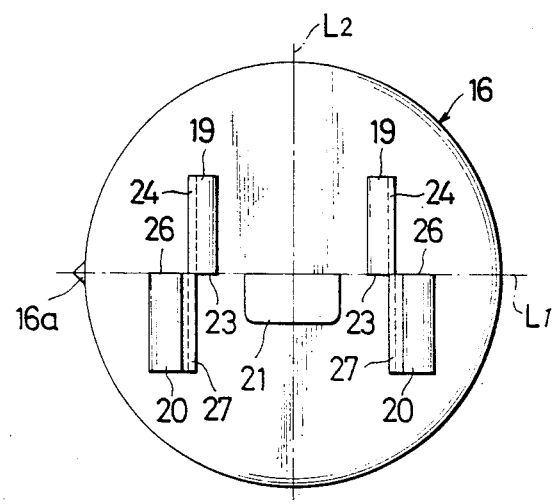
FIG. 7 is a plan view taken along line VII—VII of FIG. 6, showing a base.
Figure 8:
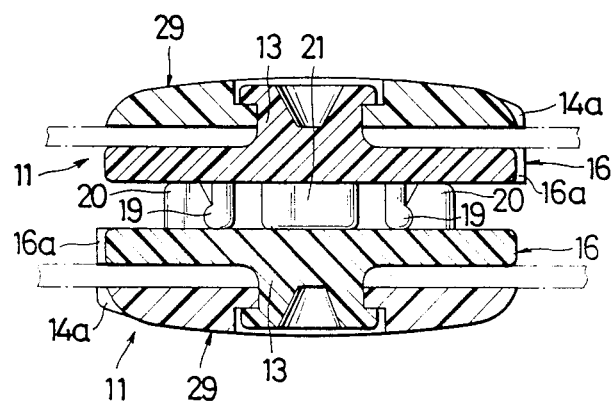
FIG. 8 is a cross-sectional view of the snappingly members, as assembled, of FIG. 6.
Figure 9:
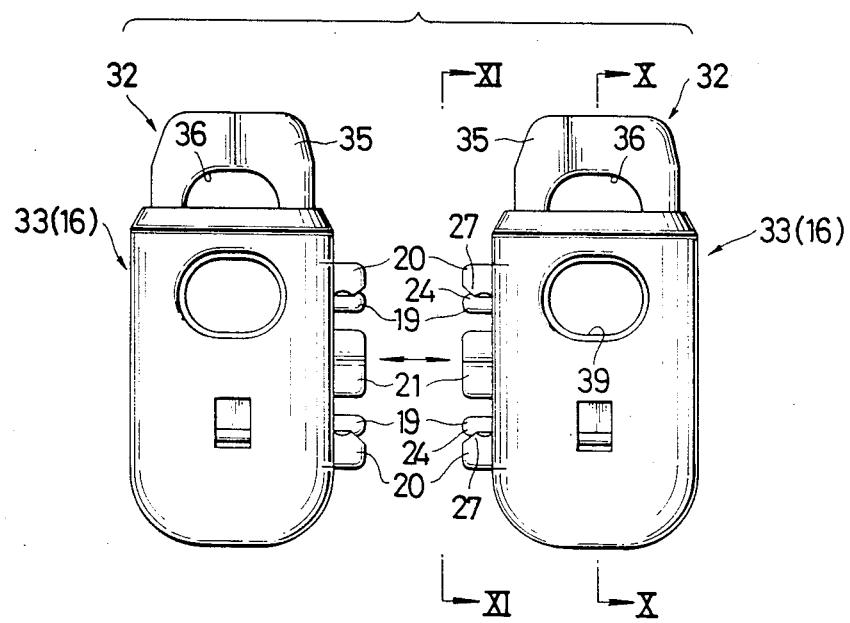
FIG. 9 is a front elevational view of snappingly engageable members according to a third embodiment of the present invention.

FIGS. 6 through 8 illustrate snappingly engageable members according to a second embodiment of the present invention, incorporated in respective snap buttons. Each of the snap buttons 11 shown in FIGS. 6 and 7 comprises a seat 29 having a central insertion hole and a snappingly engageable member having a base 16 with a stud 13 projecting from the back thereof. The stud 13 inserted in the insertion hole of the seat 29 is deformed to secure the base 16 to the seat 29, with a piece of cloth C clamped between the base 16 and the seat 29. A centering guide leg 21 is disposed between the female snap legs 20 just beneath the central line L1 of the base 16, as shown in FIG. 7, the guide leg 21 having an engaging surface aligned with the first central line L1. The guide legs 21 on the bases 16 serve to axially align the snap buttons 11 with each other when they are put together. The other structural details of the embodiment shown in FIGS. 6 through 8 are the same as those of the first embodiment. In the second embodiment, when the snap buttons 11 are put together as shown in FIG. 8, the guide legs 21 are held against each other across the first central line L1 to bring the axial centers of the snap buttons 11 easily into alignment with each other.

FIGS. 9 through 13 show snappingly engageable members according to a third embodiment of the present invention, incorporated in respective cord stoppers.

Figure 10:
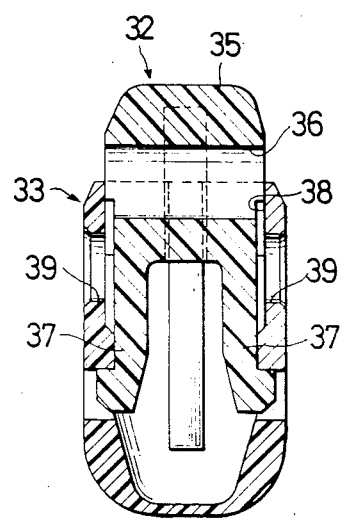
FIG. 10 is a cross-sectional view taken along line X—X of FIG. 9.

Each of the cord stoppers comprises a male member 32 and a female member 33 snappingly inserted in the male member 33. The male member 32 has a head 35 with a through hole 36 defined transversely therethrough for insertion of a cord therethrough. The male member 32 also has a pair of spaced resilient legs 37 projecting downwardly from the lower surface of the head 35, as shown in FIG. 10. The female member 33 comprises a hollow cylindrical base 16 having a vertical hole 38 for insertion of the male member 32 therein and a pair of diametrically opposite cord insertion holes 39 confronting each other horizontally and held in communication with the vertical hole 38 in an upper portion thereof. For further details of the cord stopper, reference should be made to U.S. Pat. No. 4,724,584 issued to Kasai on Feb. 16, 1988.

Figure 11:
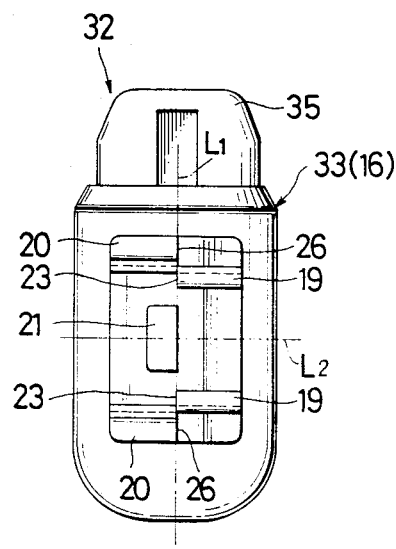
FIG. 11 is a side elevational view taken along line XI—XI of FIG. 9.
Figure 12:
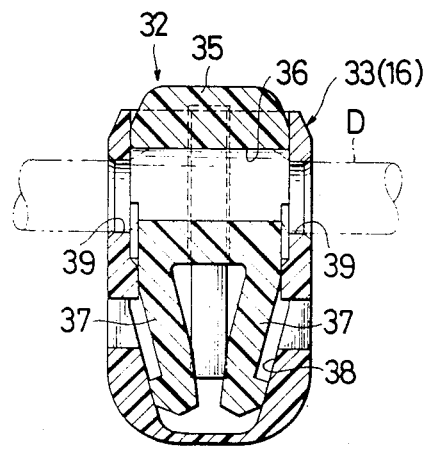
FIG. 12 is a cross-sectional view showing a snappingly engageable member of FIG. 9 with a cord inserted therethrough.
Figure 13:
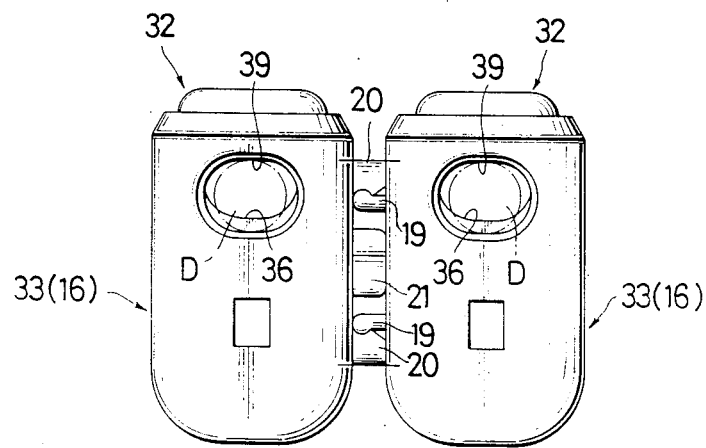

The snappingly engageable members of the third embodiment are substantially the same as those of the second embodiment shown in FIGS. 6 and 7, except that the base 16 of each of the snappingly engageable members of the third embodiment comrises the cylindrical female member 33 (see FIG. 11).

In use, the cord stoppers are mounted on the opposite ends of a cord D (FIG. 12) which has been inserted through the hood or the like of a parka, or any of various items required to be tied by a cord. Then, the snappingly engageable members of the cord stoppers are snappingly coupled to prevent the ends of the cord from swinging around (see FIG. 13).

In the third embodiment, the base 16 of each snappingly engageable member comprises the cylindrical female member 33 of the cord stopper. However, the head 35 of the male member 32 of each cord stopper may be used as the base of the snappingly engageable member.

The present invention is not limited to snappingly engageable members for use in snap buttons or cord stoppers. However, two snappingly engageable members of the present invention may be incorporated in a pair of various articles or parts that should be brought into snapping engagement with each other. The male snap legs 19 and the female snap legs 20 may be of any of various shapes such as sectorial shapes, other than the illustrated rectangular elongate form.

Although various minor modifications may be suggested by those versed in the art, it should be understood that I wish to embody within the scope of the patent warranted hereon, all such embodiments as reasonably and properly come within the scope of my contribution to the art.

What is claimed is:

1. A pair of snappingly engageable members of identical shape each comprising:

a base having a pair of male snap legs disposed on and projecting from one surface thereof in spaced confronting relation to each other, said male snap legs having bulging portions, respectively, projecting laterally away from each other, and a pair of female snap legs disposed on said one surface in spaced confronting relation to each other, said female snap legs projecting from said one surface in the same direction as said male snap legs and having a pair of locking portions, respectively, projecting laterally toward each other, said bulging portions and said locking portions having longitudinal ends partially touching to and confronting each other.

2. A pair of snappingly engageable members according to claim 1, said base having a disc shape.

3. A pair of snappingly engageable members according to claim 2, said male snap legs having an elongate shape and extending parallel to each other, said male snap legs having first stopper surfaces, respectively, aligned with a first central line extending diametrically across said base, said female snap legs having an elongate shape and extending parallel to each other, said female snap legs having second stopper surfaces, respectively, aligned with said first central line and disposed contiguous to said first stopper surfaces.

4. A pair of snappingly engageable members according to claim 3, said male snap legs being disposed symmetrically with respect to a second central line extending diametrically across said base perpendicularly to said first central line, said female snap legs being disposed symmetrically with respect to said second central line.

5. A pair of snappingly engageable members according to claim 4, said female snap legs being spaced farther from said second central line than said male snap legs.

6. A pair of snappingly engageable members according to claim 1, said base having a cylindrical shape.

7. A pair of snappingly engageable members of identical shape each comprising: a base having a pair of male snap legs having bulging portions, respectively, projecting laterally away from each other, and a pair of female snap legs disposed on said one surface in spaced confronting relation to each other, said female snap legs having a pair of locking portions, respectively, projecting laterally to each other, said bulging portions and said locking portions having longitudinal ends confronting each other, said base having a disc shape, said male snap legs having an elongate shape and extending parallel to each other, said male snap legs having first stopper surfaces, respectively, aligned with a first central line extending diametrically across said base, said female snap legs having an elongate shape and extending parallel to each other, said female snap legs having second stopper surfaces, respectively, aligned with said first central line and disposed contiguous to said first stopper surfaces, said male snap legs being disposed symmetrically with respect to a second central line extending diametrically across said base perpendicularly to said first central line, said female snap legs being disposed symmetrically with respect to said second central line, and further including a guide leg disposed between said female snap legs and lying across said second central line.

8. A pair of snappingly engageable members according to claim 7, said guide leg having an elongate shape extending along said first central line remotely from the first central line.

9. A pair of snappingly engageable members according to claim 7, said guide leg having an elongate shape extending along said first central line adjacent to the first central line.

* * * * *